US011012420B2

(12) United States Patent
Sevinc et al.

(10) Patent No.: US 11,012,420 B2
(45) Date of Patent: May 18, 2021

(54) THIRD-PARTY SERVICE CHAINING USING PACKET ENCAPSULATION IN A FLOW-BASED FORWARDING ELEMENT

(71) Applicant: Nicira, Inc., Palo Alto, CA (US)

(72) Inventors: Soner Sevinc, San Francisco, CA (US); Yang Song, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 243 days.

(21) Appl. No.: 15/814,287

(22) Filed: Nov. 15, 2017

(65) Prior Publication Data

US 2019/0149512 A1 May 16, 2019

(51) Int. Cl.
| G06F 9/00 | (2006.01) |
| G06F 15/16 | (2006.01) |
| G06F 17/00 | (2019.01) |
| H04L 29/06 | (2006.01) |

(52) U.S. Cl.
CPC ........ *H04L 63/029* (2013.01); *H04L 63/0218* (2013.01); *H04L 63/0236* (2013.01); *H04L 63/0245* (2013.01); *H04L 63/0263* (2013.01); *H04L 63/162* (2013.01); *H04L 63/164* (2013.01); *H04L 63/20* (2013.01)

(58) Field of Classification Search
CPC ............... H04L 63/029; H04L 63/0245; H04L 63/0236; H04L 63/0263; H04L 63/20; H04L 63/0218; H04L 63/164; H04L 63/162

See application file for complete search history.

(56) References Cited

U.S. PATENT DOCUMENTS

| 6,006,264 A | 12/1999 | Colby et al. |
| 6,104,700 A | 8/2000 | Haddock et al. |
| 6,154,448 A | 11/2000 | Petersen et al. |
| 6,772,211 B2 | 8/2004 | Lu et al. |

(Continued)

FOREIGN PATENT DOCUMENTS

| CN | 1689369 A | 10/2005 |
| CN | 101729412 A | 6/2010 |

(Continued)

OTHER PUBLICATIONS

Author Unknown, "Datagram," Jun. 22, 2012, 2 pages, retrieved from https://web.archive.org/web/20120622031055/https://en.wikipedia.org/wiki/datagram.

(Continued)

*Primary Examiner* — Amie C. Lin
(74) *Attorney, Agent, or Firm* — Adeli LLP

(57) ABSTRACT

A method of enforcing security rules for a packet on a host is provided. The method at a security service dispatcher, determines a dispatching action on a packet for each of a group of security services. Each security service is for enforcing a set of security rules on each packet. The method for each security service, sends the packet to the security service when the dispatch rule for the security service indicates that the set of security rules of the security service has to be enforced on the packet. The method for each security service, bypasses the enforcement of the security rules of the security service when the dispatch rule for the security service indicates that the set of security rules of the security service has to be bypassed for the packet.

20 Claims, 9 Drawing Sheets

(56) References Cited

U.S. PATENT DOCUMENTS

| | | |
|---|---|---|
| 6,779,030 B1 | 8/2004 | Dugan et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,649,890 B2 | 1/2010 | Mizutani et al. |
| 7,818,452 B2 | 10/2010 | Matthews et al. |
| 7,898,959 B1 | 3/2011 | Arad |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,914,406 B1 | 12/2014 | Haugsnes et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,191,293 B2 | 11/2015 | Iovene et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 10,013,276 B2 | 7/2018 | Fahs et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,516,568 B2 | 12/2019 | Jain et al. |
| 10,594,743 B2 | 3/2020 | Hong et al. |
| 10,609,091 B2 | 3/2020 | Hong et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,805,181 B2 | 10/2020 | Boutros et al. |
| 10,805,192 B2 | 10/2020 | Boutros et al. |
| 10,812,378 B2 | 10/2020 | Nainar et al. |
| 2002/0078370 A1* | 6/2002 | Tahan .................. H04L 63/104 726/11 |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1* | 5/2005 | Akundi ................ H04L 45/308 713/153 |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1* | 8/2006 | Fulp .................... H04L 63/0263 726/11 |
| 2006/0233155 A1 | 10/2006 | Srivastava |
| 2007/0061492 A1 | 3/2007 | Riel |
| 2007/0121615 A1 | 5/2007 | Weill et al. |
| 2007/0214282 A1 | 9/2007 | Sen |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |

(56) References Cited

U.S. PATENT DOCUMENTS

| | | |
|---|---|---|
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1* | 4/2008 | Fukunaga ............ H04L 43/028 370/389 |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0311637 A1 | 11/2013 | Kamath et al. |
| 2013/0318219 A1 | 11/2013 | Kancherla |
| 2013/0332983 A1 | 12/2013 | Koorevaar et al. |
| 2013/0343378 A1 | 12/2013 | Veteikis et al. |
| 2014/0003422 A1 | 1/2014 | Mogul et al. |
| 2014/0010085 A1 | 1/2014 | Kavunder et al. |
| 2014/0046997 A1 | 2/2014 | Dain et al. |
| 2014/0046998 A1 | 2/2014 | Dain et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092914 A1 | 4/2014 | Kondapalli |
| 2014/0096183 A1* | 4/2014 | Jain ................ H04L 12/4633 726/1 |
| 2014/0101226 A1 | 4/2014 | Khandekar et al. |
| 2014/0101656 A1 | 4/2014 | Zhu et al. |
| 2014/0115578 A1 | 4/2014 | Cooper et al. |
| 2014/0129715 A1 | 5/2014 | Mortazavi |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0269724 A1 | 9/2014 | Mehler et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson et al. |
| 2014/0317677 A1 | 10/2014 | Vaidya et al. |
| 2014/0321459 A1* | 10/2014 | Kumar ................ H04L 47/2425 370/360 |
| 2014/0330983 A1 | 11/2014 | Zisapel et al. |
| 2014/0334485 A1 | 11/2014 | Jain et al. |
| 2014/0351452 A1 | 11/2014 | Bosch et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |

(56) References Cited

U.S. PATENT DOCUMENTS

| | | |
|---|---|---|
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1* | 1/2015 | Zhang .................. H04L 45/38 370/250 |
| 2015/0023354 A1 | 1/2015 | Li et al. |
| 2015/0026345 A1 | 1/2015 | Ravinoothala et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0078384 A1 | 3/2015 | Jackson et al. |
| 2015/0103645 A1 | 4/2015 | Shen et al. |
| 2015/0103679 A1 | 4/2015 | Tessmer et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0237013 A1 | 8/2015 | Bansal et al. |
| 2015/0242197 A1 | 8/2015 | Alfonso et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0365322 A1 | 12/2015 | Shatzkamer et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0057050 A1 | 2/2016 | Ostrom et al. |
| 2016/0057687 A1 | 2/2016 | Horn et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0105333 A1* | 4/2016 | Lenglet ................. H04L 43/024 370/252 |
| 2016/0119226 A1 | 4/2016 | Guichard et al. |
| 2016/0127564 A1 | 5/2016 | Sharma et al. |
| 2016/0134528 A1 | 5/2016 | Lin et al. |
| 2016/0149816 A1 | 5/2016 | Roach et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197839 A1 | 7/2016 | Li et al. |
| 2016/0205015 A1 | 7/2016 | Halligan et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0337189 A1 | 11/2016 | Liebhart et al. |
| 2016/0337249 A1 | 11/2016 | Zhang et al. |
| 2016/0344565 A1 | 11/2016 | Batz et al. |
| 2016/0344621 A1 | 11/2016 | Roeland et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019329 A1 | 1/2017 | Kozat et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064749 A1 | 3/2017 | Jain et al. |
| 2017/0078176 A1 | 3/2017 | Lakshmikantha et al. |
| 2017/0126497 A1 | 5/2017 | Dubey et al. |
| 2017/0126522 A1 | 5/2017 | McCann et al. |
| 2017/0134538 A1 | 5/2017 | Mahkonen et al. |
| 2017/0142012 A1 | 5/2017 | Thakkar et al. |
| 2017/0149582 A1 | 5/2017 | Cohn et al. |
| 2017/0149675 A1 | 5/2017 | Yang |
| 2017/0163531 A1 | 6/2017 | Kumar et al. |
| 2017/0195255 A1 | 7/2017 | Pham et al. |
| 2017/0208011 A1 | 7/2017 | Bosch et al. |
| 2017/0230333 A1* | 8/2017 | Glazemakers .......... H04L 47/70 |
| 2017/0230467 A1 | 8/2017 | Salgueiro et al. |
| 2017/0237656 A1 | 8/2017 | Gage |
| 2017/0250902 A1 | 8/2017 | Rasanen et al. |
| 2017/0250917 A1 | 8/2017 | Ruckstuhl et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317926 A1 | 11/2017 | Penno et al. |
| 2017/0317954 A1 | 11/2017 | Masurekar et al. |
| 2017/0324651 A1 | 11/2017 | Penno et al. |
| 2017/0331672 A1 | 11/2017 | Fedyk et al. |
| 2017/0339110 A1* | 11/2017 | Ni ....................... H04L 63/0236 |
| 2017/0339600 A1 | 11/2017 | Roeland et al. |
| 2017/0346764 A1 | 11/2017 | Tan et al. |
| 2017/0364794 A1 | 12/2017 | Mahkonen et al. |
| 2017/0373990 A1 | 12/2017 | Jeuk et al. |
| 2018/0041524 A1 | 2/2018 | Reddy et al. |
| 2018/0063018 A1 | 3/2018 | Bosch et al. |
| 2018/0091420 A1 | 3/2018 | Drake et al. |
| 2018/0115521 A1* | 4/2018 | Curcio ................ H04L 63/0263 |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0184281 A1 | 6/2018 | Tamagawa et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0213040 A1 | 7/2018 | Pak et al. |

(56) References Cited

U.S. PATENT DOCUMENTS

| | | |
|---|---|---|
| 2018/0227216 A1 | 8/2018 | Hughes |
| 2018/0234360 A1 | 8/2018 | Narayana et al. |
| 2018/0248755 A1 | 8/2018 | Hecker et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0295053 A1 | 10/2018 | Leung et al. |
| 2018/0302242 A1 | 10/2018 | Hao et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0132220 A1 | 5/2019 | Boutros et al. |
| 2019/0132221 A1 | 5/2019 | Boutros et al. |
| 2019/0140947 A1 | 5/2019 | Zhuang et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0229937 A1 | 7/2019 | Nagarajan et al. |
| 2019/0238363 A1 | 8/2019 | Boutros et al. |
| 2019/0238364 A1 | 8/2019 | Boutros et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0076684 A1 | 3/2020 | Naveen et al. |
| 2020/0076734 A1 | 3/2020 | Naveen et al. |
| 2020/0145331 A1 | 5/2020 | Bhandari et al. |
| 2020/0162318 A1 | 5/2020 | Patil et al. |
| 2020/0204492 A1 | 6/2020 | Sarva et al. |
| 2020/0213366 A1 | 7/2020 | Hong et al. |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0322271 A1 | 10/2020 | Jain et al. |
| 2020/0366526 A1 | 11/2020 | Boutros et al. |
| 2020/0366584 A1 | 11/2020 | Boutros et al. |

FOREIGN PATENT DOCUMENTS

| | | |
|---|---|---|
| CN | 103516807 A | 1/2014 |
| CN | 103795805 A | 5/2014 |
| EP | 2426956 A1 | 3/2012 |
| JP | 2005311863 A | 11/2005 |
| WO | 9918534 A2 | 4/1999 |
| WO | 2008095010 A1 | 8/2008 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2020046686 A1 | 3/2020 |
| WO | 2020171937 A1 | 8/2020 |

OTHER PUBLICATIONS

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, CISCO.

Casado, Martin, et al., "Virtualizing the Network Forwarding Plane," Dec. 2010, 6 pages.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.

Kumar, S., et al., "Service Function Chaining Use Cases in Data Centers," draft-ietf-sfc-dc-use-cases-01, Jul. 21, 2014, 23 pages, IETF.

Liu, W., et al., "Service Function Chaining (SFC) Use Cases," draft-liu-sfc-use-cases-02, Feb. 13, 2014, 17 pages, IETF.

Non-Published Commonly Owned U.S. Appl. No. 16/905,909, filed Jun. 18, 2020, 36 pages, Nicira, Inc.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Siasi, N., et al., "Container-Based Service Function Chain Mapping," 2019 SoutheastCon, Apr. 11-14, 2019, 6 pages, IEEE, Huntsville, AL, USA.

\* cited by examiner

THIRD-PARTY SERVICE CHAINING USING PACKET ENCAPSULATION IN A FLOW-BASED FORWARDING ELEMENT

BACKGROUND

A flow-based software switch operates on a host by matching incoming packets with one or more flow entries. Each flow entry includes a set of matching criteria and a set of actions. The matching criteria specify a subset of the packet header values for which it requires a match. When a packet matches the set of matching criteria of a flow entry, the action or actions specified by the corresponding set of actions are performed on the packet.

Distributed firewalls provide the ability to specify firewall rules for enforcement at different enforcement points within a network. Distributed firewall rules are specified at the management plane of the flow-based software switch and pushed down to the virtualization software of the host. It is desirable to allow third party networking services to provide security and firewall rules and enforce them in the same pipeline that enforces the distributed firewall rules on the host.

BRIEF SUMMARY

Some embodiments provide a method that enables third party services to impose their network security policies within the virtualization software (e.g., the hypervisor) of a host machine. The method allows different services to impose their own criteria for whether to accept or drop a packet. The service-specific security logic for these embodiments resides in a service virtual machine (SVM) local to the virtualization software of a host or at a remote virtual or physical computing node. This is unlike the typical distributed firewall (DFW) rules, which are specified at the management plane (MP) and pushed down to the virtualization software. Packets are sent to the SVM or the remote computing node in order to obtain a security verdict.

In some embodiments, the packet processing operations (e.g., classification operations, forwarding actions, etc.) are performed by a managed forwarding element (MFE) that operates as a software forwarding element. Some embodiments use a set of application programming interfaces (APIs) that is integrated into the MFE to provide third party services access to network data flows. The DFW and the third party security rules work together and a packet has to pass both the MP specified rules of the DFW and the logic of one or more third party services in order to be accepted.

Some embodiments provide a set of dispatch rules that decides whether a packet should be sent to a security service machine or not in the first place. These dispatch rules are co-located within the DFW pipeline and determine whether a packet should be (i) sent to a local service VM, (ii) sent to a remote computing node, or (iii) just copied to the next stage in the DFW pipeline. These dispatch actions are not the ultimate packet accept or drop decisions and just determine whether the packet is sent to a service VM or remote service box. Only when a service VM or a remote computing node processes the packet and decides to accept the packet, the packet is sent back, and the pipeline goes on from where it left off.

The dispatch rules in some embodiments are stateful. For a stateful dispatch rule, the same dispatch operation that is performed for a packet is also performed for the corresponding response packet. Some embodiments keep a separate connection tracker entry per service. In some embodiments a security service can write an action overwrite into a connection tracker entry out of band in order to accept or deny the connection packets without sending the packets to the security service anymore.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method that enables third party services to impose their network security policies within the virtualization software of a host machine. The method allows different services to impose their own criteria for whether to accept or drop a packet. The service-specific security logic for these embodiments resides in an SVM local to the virtualization software of a host or at a remote dedicated box such as a physical or virtual computing node outside the host. This is unlike the typical distributed firewall rules, which are specified at the management plane and pushed down to the virtualization software. Packets are sent to the SVM or the remote dedicated box in order to obtain a security verdict.

I. Chaining of the Third Party Security Rules with the Distributed Firewall Rules In some embodiments, the packet processing operations (e.g., classification operations, forwarding actions, etc.) are performed by a managed forwarding element (MFE) that operates as a software forwarding element. Open vSwitch (OVS) is an example of a flow entry-based software forwarding element. In some embodiments, MFEs operate on host machines that host virtual machines or other data compute nodes that serve as the sources and destinations for packets (e.g., in the virtualization software of such a host machine). For example, an MFE might operate on a host machine that hosts virtual machines for several different logical networks, and would implement the several logical networks for each of the virtual machines residing on the host. The MFE in some embodiments is configured and managed by a network controller.

Some embodiments provide a distributed firewall with the ability to specify for a particular firewall rule to be enforced at a set of enforcement points such as network nodes and virtual interfaces inside the network. Some of these embodiments also provide a set of tools that enable third party services that do not have direct access to the virtualization software of a host to impose their network security policies within the virtualization software of a host machine by using the provided tools.

Figure 1:
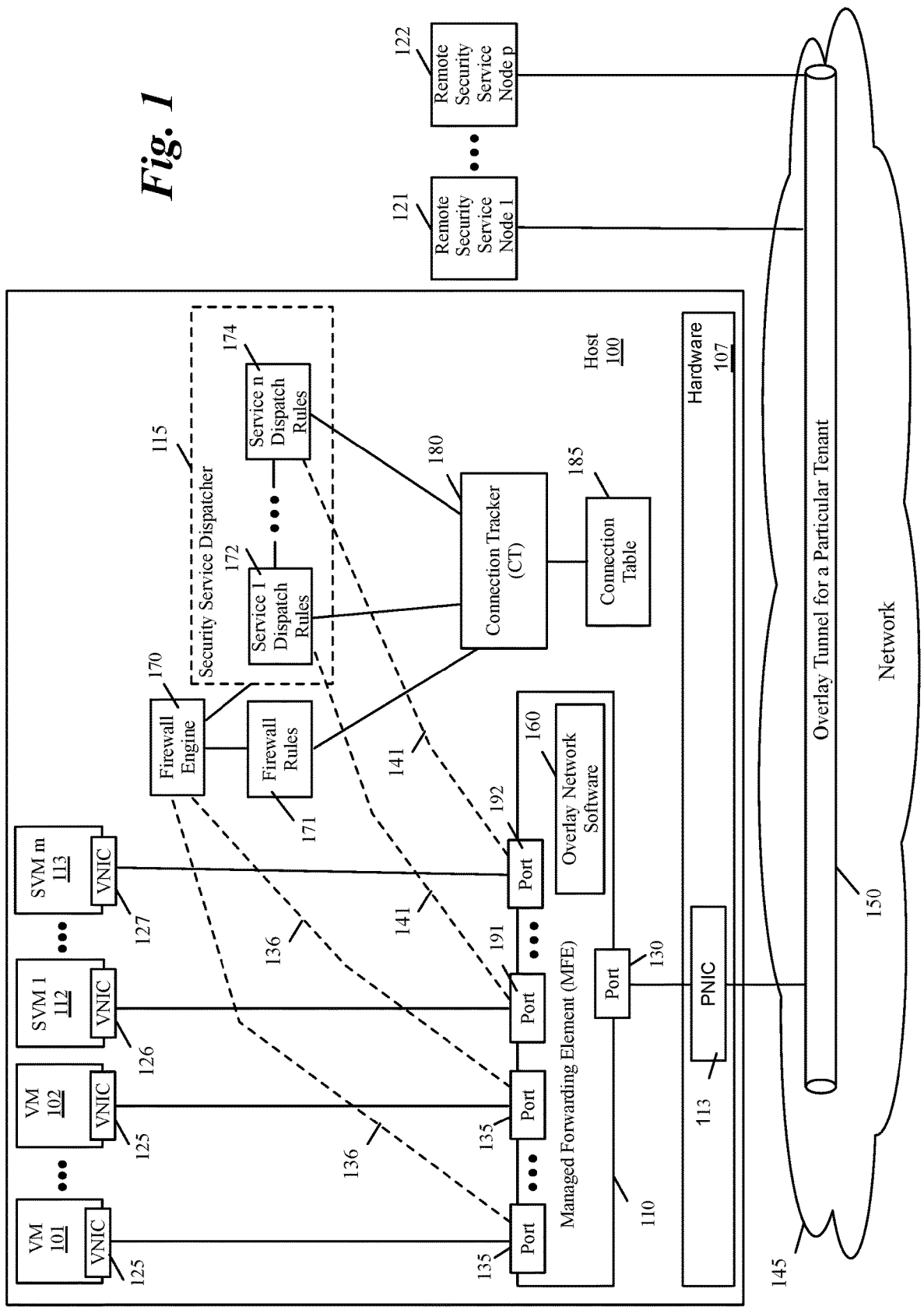
FIG. 1 conceptually illustrates a host with a firewall and security pipeline that allows third party services to impose their network security policies in a host in some embodiments.

FIG. 1 conceptually illustrates a host 100 with a firewall and security pipeline that allows third party services to impose their network security policies in a host in some embodiments. As shown, the host 100 is hosting several virtual machines (VMs) 101-102. A VM is an emulation (or software implementation) of a particular computer system.

In some embodiments, the VMs execute on top of virtualization software (not shown) that is executing on the host. The host also includes a managed forwarding element (MFE) 110, a firewall and security pipeline that includes a firewall engine 170, a set of firewall rules 171, and a security service dispatcher 115 with a set of one or more service rules 172-174, a connection tracker (CT) 180, and a set of local security service nodes such as service VMs (SVMs) 112-113.

The MFE executes on the host to communicatively couple the VMs of the host to each other and to other devices outside of the host (e.g., other VMs on other hosts) through one or more forwarding elements (e.g., switches and/or routers) that operate outside of the host. As shown, MFE 110 includes a port 130 to connect to a physical network interface card (PNIC) 113 of the host, and one or more ports 135 to connect to the virtual network interface card (VNIC) 125 of each VM.

In some embodiments, the VNICs are software abstractions of the PNIC that are implemented by the virtualization software of the host. Each VNIC is responsible for exchanging data messages between its VM and the MFE 110 through its corresponding MFE port. As shown, a VM's egress data path for its data messages includes (1) the VM's VNIC 125, (2) the MFE port 135 that connects to this VNIC, (3) the MFE 110, and (4) the MFE port 130 that connects to the host's PNIC.

Through its port 130 and a NIC driver (not shown), the MFE 110 connects to the host's PNIC 113 to send outgoing packets and to receive incoming packets. As shown in FIG. 1, the host 100 includes hardware 107 (although the figure shows a software architecture diagram, the hardware 107 is displayed in order to represent the PNIC 113 of the host machine). The MFE 110 forwards messages that it receives on one of its ports to another one of its ports. In some embodiments, the MFE 110 is a software switch, while in other embodiments it is a software router or a combined software switch/router.

The MFE performs packet-processing operations to forward packets that it receives on one of its ports to another one of its ports. For example, in some embodiments, the MFE tries to use data in the packet (e.g., data in the packet header) to match a packet to flow based rules, and upon finding a match, to perform the action specified by the matching rule.

Also, in some embodiments, the MFE of one host can form multiple logical forwarding elements (LFEs) with MFEs of other hosts, with each LFE serving a conceptual switch that services a logical network. In other words, different LFEs can be defined to specify different logical networks for different users, and each LFE can be defined by multiple MFEs on multiple hosts. Overlay networks provide one manner for creating such LFEs.

An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is a Layer 2 (L2) overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks. GENEVE encapsulates packets in a GENEVE header to tunnel L2 packets over L3 networks.

The MFE ports 135 in some embodiments include one or more function calls to one or more modules that implement special input/output (I/O) operations on incoming and outgoing packets that are received at the ports. One of these function calls for a port (as shown by lines 136) is to the firewall engine 170.

The firewall engine 170 performs firewall operations on incoming and/or outgoing packets (i.e., on packets that are received by the host for one of the VMs or on packets that are sent by one of the VMs). Also, in some embodiments, other virtual interfaces (VIFs) in the data path (such as the VNICs, etc.) implement the I/O function call operations (such as the firewall function calls). In some embodiments, the firewall engine 170 can also be called by the port 130 that connects to the physical NIC's driver (e.g., for incoming packets).

The firewall engine tries to match the received packets' identifiers (e.g., five-tuple identifiers extracted from the packet header) with the associated identifiers (e.g., five-tuple identifiers) of the firewall rules 171 of the VNIC that is the destination of an incoming packet or the source of an outgoing packet. In other words, to match a rule with a packet, the firewall engine 170 identifies n-data tuples for a packet (e.g., extracts these tuples from the packet's header) and compares the identified tuples with the n-data tuples of each rule.

Some embodiments allow different third party services to impose their own security criteria on packets. For instance, each service can have a set of rules to determine whether to accept or drop a packet. The third party services are typically provided by entities that do not have direct access to the virtualization of the host machine. Examples of these services are the services provided by vendors other than the vendor of the virtualization software or the firewall, services that are provided by a tenant in a multi-tenant host, etc.

Unlike the distributed firewall rules, which are specified at the management plane and pushed down to the virtualization software of the host and implemented, each service-specific security logic resides either in a local security service node 112-113 (such as a service VM (SVM) local to the host) or at a remote dedicated box 121-122 (such as a physical or virtual data compute node outside of the host 100).

The software to enforce the third party security service rules is packaged as an open virtualization format (OVF) package and is downloaded and installed in a service VM 112-113 or in a remote security service machine 121-122. The software in some embodiments communicates with the network using representational state transfer (REST) APIs.

Packets are sent (as shown by lines 141) to the corresponding security service machine of each service to obtain a verdict. For instance, each port 191-192 on the MFE 110 is used to send packets to one of the local security service machines 112-113 (through a corresponding VNIC 126127) or to one of the remote security service machines 121-122 in order to enforce security rules on the packets and send the verdicts back to the security service dispatcher 115. A packet should pass both the MP specified rules (i.e., the DFW rules) and the security services logic in order to be accepted.

Different embodiments forward the packets from a service dispatch rules module 172-174 to the service VM 127-127 differently. For instance, in some embodiments, the service dispatch rules module encapsulates the packets with an overlay network header and sends the encapsulated packet through one of the MFE ports 191-192 410 to the service VM's VNIC 126-127 through an overlay network 160. Since the service VM is on the same host as the service rule module, the packets do not leave the host and are delivered to the service VM by the MFE through an overlay tunnel in the host.

In other embodiments, the service VM 112-113 and the corresponding service dispatch rules module 172-174 have access to a common memory. In these embodiments, the service rule module places the packets that are copied to the service VM in memory and the service VM accesses the packets from memory. Similarly, the service VM places the returned packet in memory and the service rules module accesses the packet from memory.

In alternative embodiments, the security service is implemented as a process that runs on the host operating system. These embodiments remove the overhead of using a service VM, as the security service process can interact with other processes in the host, e.g., through the control plane. In these embodiments, each security service process also communicates with the corresponding service rules module through the MFE or a common memory that is accessible by both the security service process and the service rules module.

Some embodiments use a set of APIs that is integrated into the MFE to provide third party services access to network data flows. Network Extensibility (NetX) is an example of such APIs. The NetX APIs allow third party partners to insert their security service rules in the corresponding service VM or remote service machine. Each NetX service provides a service VM (or a remote service machine) as well as a set of rules 172-174 that decides whether a packet should be sent to the corresponding service VM (or the remote service machine) or not in the first place.

The NetX service dispatch rules 172-174, on the other hand, are co-located with the DFW pipeline and are implemented similar to the DFW rules using OVS flows. The NSX service dispatch rules can reside in the same or in a separate table than DFW rule flows. In contrast to the security service rules that reside in machines 112-113 and 121-122 (that decide whether a packet should be accepted or dropped), the NetX service dispatch rules 172-174 (that decide whether or not the security services should be activated) are specified through the management plane and are pushed down to the virtualization software. Although several examples are provided herein by reference to NetX, it should be understood that other APIs can be used to provide third party services access to network data flows.

Flow entries of the MFE 110 in some embodiments are stateless. The flow entry rules are written over only the stateless fields and metadata of the packet that are being processed. However, to implement a firewall, some firewall rules require knowledge of connection state. For instance, a firewall rule may require packets received from outside the host of the MFE on a new connection to be dropped while packets received from outside the host of the MFE on established connections to be allowed.

When a firewall rule requires the packet connection status, the matching criteria in the flow entry that defines the firewall rule refer to the packet connection status. As a result, the incoming packets are sent to the connection tracker 180 when packet matches a flow entry that specifies an action that requires accessing the connection tracker. The connection tracker 180 has a connection table 185. Each stateful entry in the connection table 185 represents a connection that can be used to match packets in the ingress or egress directions.

A. Priority of DFW and NetX Rules

NetX rules in some embodiments are similar to DFW rules but have new action types. Examples of NetX action types include PUNT, REDIRECT and COPY. PUNT sends a packet to a local security service machine, REDIRECT sends a packet to a remote service box, and COPY just copies the packet to the next entity in the firewall and security pipeline. As described above, PUNT, REDIRECT and COPY actions are not the ultimate packet accept or drop decisions, but determine whether or not a packet is sent to a security service machine 112-113 or 121-122. Only when a security service machine processes the packet and decides to accept the packet, the packet is sent back to the firewall and security pipeline and the pipeline goes on from where it left off.

Figure 2:
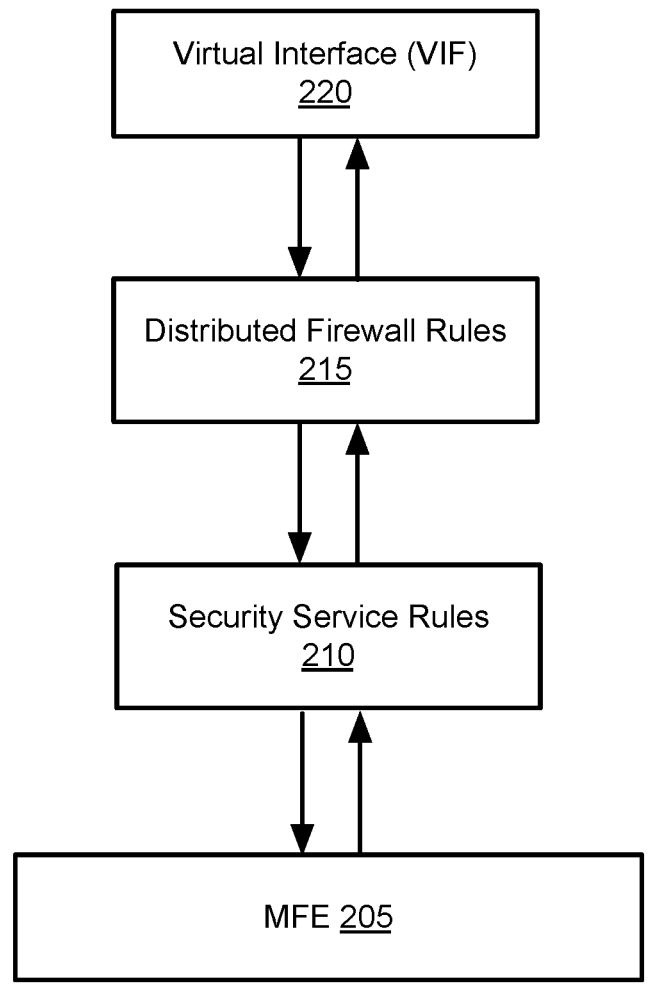
FIG. 2 conceptually illustrates the ordering of DFW rules versus the third party security service rules in some embodiments.

FIG. 2 conceptually illustrates the ordering of DFW rules versus the third party security service rules in some embodiments. The figure shows an MFE 205 that sends packets to and receives packets from a virtual interface (VIF) 220. A VIF is an abstraction of a network interface that allows the applications to access the interface independent of the physical interface involved. Examples of the VIF 220 include a port 135 that connects a VNIC 125 to the MFE, a port 130 that connects the MFE to a PNIC of the host 100, and a VNIC 125.

As shown, the priority of DFW with respect to the third party security services changes depending on the direction of the traffic. In the switch-ingress direction (when a packet travels from VIF 220 to MFE 204), DFW rules 215 are executed first. On the other hand, in the switch-egress direction, security service rules 210 are executed first.

Figure 3:
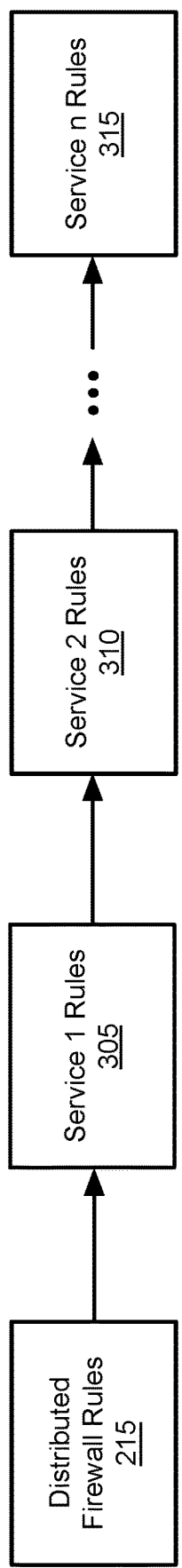
FIG. 3 conceptually illustrates the ordering of DFW and several third party security services in the switch-ingress direction in some embodiments.

In addition, the DFW rules and NetX rules in some embodiments have priorities that are determined based on whether a packet is travelling in ingress or egress direction. The relative ordering of security services among themselves, however, do not depend on the packet direction. FIG. 3 conceptually illustrates the ordering of DFW and several third party security services in the switch-ingress direction in some embodiments. As shown, the DFW rules 215 are performed first followed by the security service rules 305. Each service specifies its rules as if it is a standalone firewall module. Once a service allows the packet, the next service with the lower priority is executed.

Security service rules that belong to the same service have priority numbers that are meaningful only within the same service. Security services also have priority ordering among them. For instance, Service 1 305 in FIG. 3 has the highest priority among the security services 305-315 and service n 315 has the lowest priority. When the DFW and all services allow a packet, the packet goes through. Otherwise, the packet is dropped.

Figure 4:
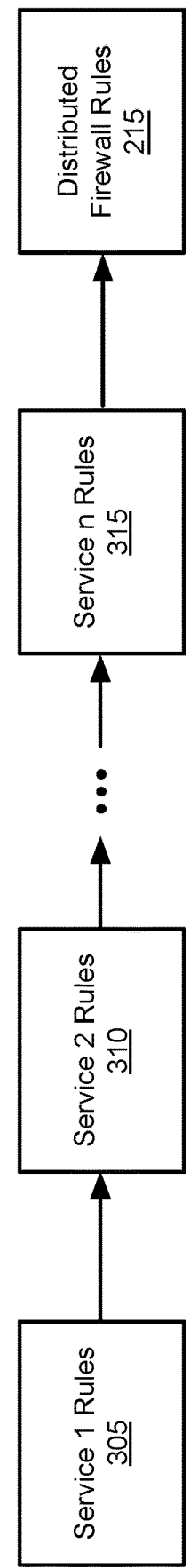
FIG. 4 conceptually illustrates the ordering of DFW and several third party security services in the switch-egress direction in some embodiments.

FIG. 4 conceptually illustrates the ordering of DFW and several third party security services in the switch-egress direction in some embodiments. As shown, the security service rules 305 are enforced first, followed by the DFW rules 215. Similar to FIG. 3, each service specifies its rules as if it is a standalone firewall module. Once a service allows the packet, the next service with the lower priority is executed. After the lowest priority service 305 allows that packet, the DFW rules 215 are enforced on the packet.

The priority of the third party service rules 305-615 shown in FIGS. 3 and 4 can change over time. For instance, the priority of the service rules may change by a user in the management plane similar to the DFW rules using OVS flows.

Figure 5:
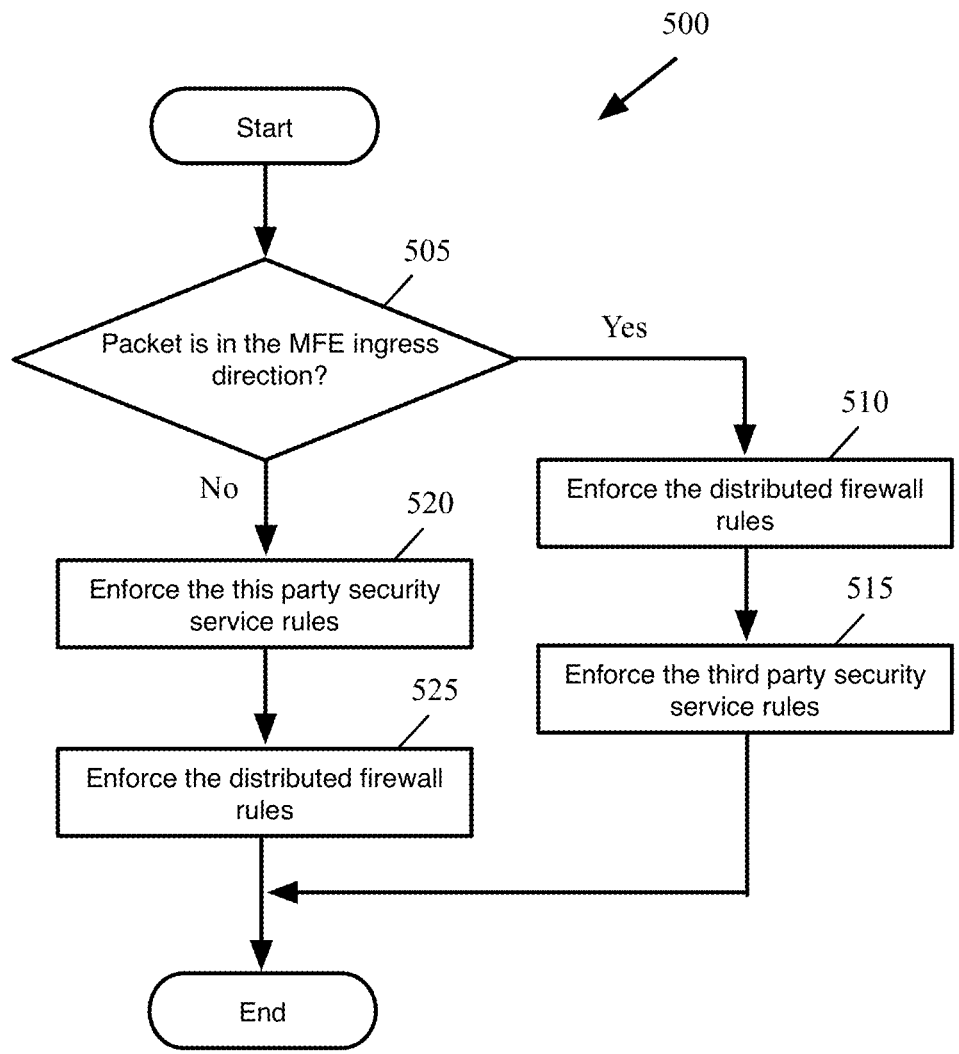
FIG. 5 conceptually illustrates a process for prioritizing the enforcement of the distributed firewall rules and the third party security service rules for a packet in some embodiments.

FIG. 5 conceptually illustrates a process 500 for prioritizing the enforcement of the distributed firewall rules and the third party security service rules for a packet in some embodiments. The process in some embodiments is performed by the firewall engine 170 in FIG. 1. As shown, the process determines (at 505) whether the packet is in the MFE's ingress direction. For instance, the process determines whether the packet is sent from the VIF 220 to the MFE 205 in FIG. 2. If the packet is not in the MFE ingress direction, the process proceeds to 520, which is described below.

Otherwise, the process enforces (at 510) the distributed firewall rules. For instance, the process activates a set of modules to enforce the distributed firewall rules. Next, the process enforces (at 515) the third party security rules. For instance, the process activates one or more security service modules to enforce the corresponding third party security rules. Details of enforcing the third party security rules are described below by reference to FIG. 7. The process then ends.

When the packet is in the MFE's egress path, the process enforces (at 520) the third party security rules. For instance, the process activates one or more security service modules to enforce the corresponding security service. Next, the process enforces (at 525) the distributed firewall rules. For instance, the process activates a set of modules to check the distributed firewall rules. The process then ends.

B. Firewall and Security Pipeline

In order to incorporate third party security rules, some embodiments provide repetition logic in the DFW pipeline. Instead of a single firewall table, there has to be a conjunction of a variable number of firewall and security tables, one per service. As a result of this semantic change, a packet has to be sent to connection tracker module multiple times. Similarly, rule lookup has to be done multiple times, once per service.

Figure 6:
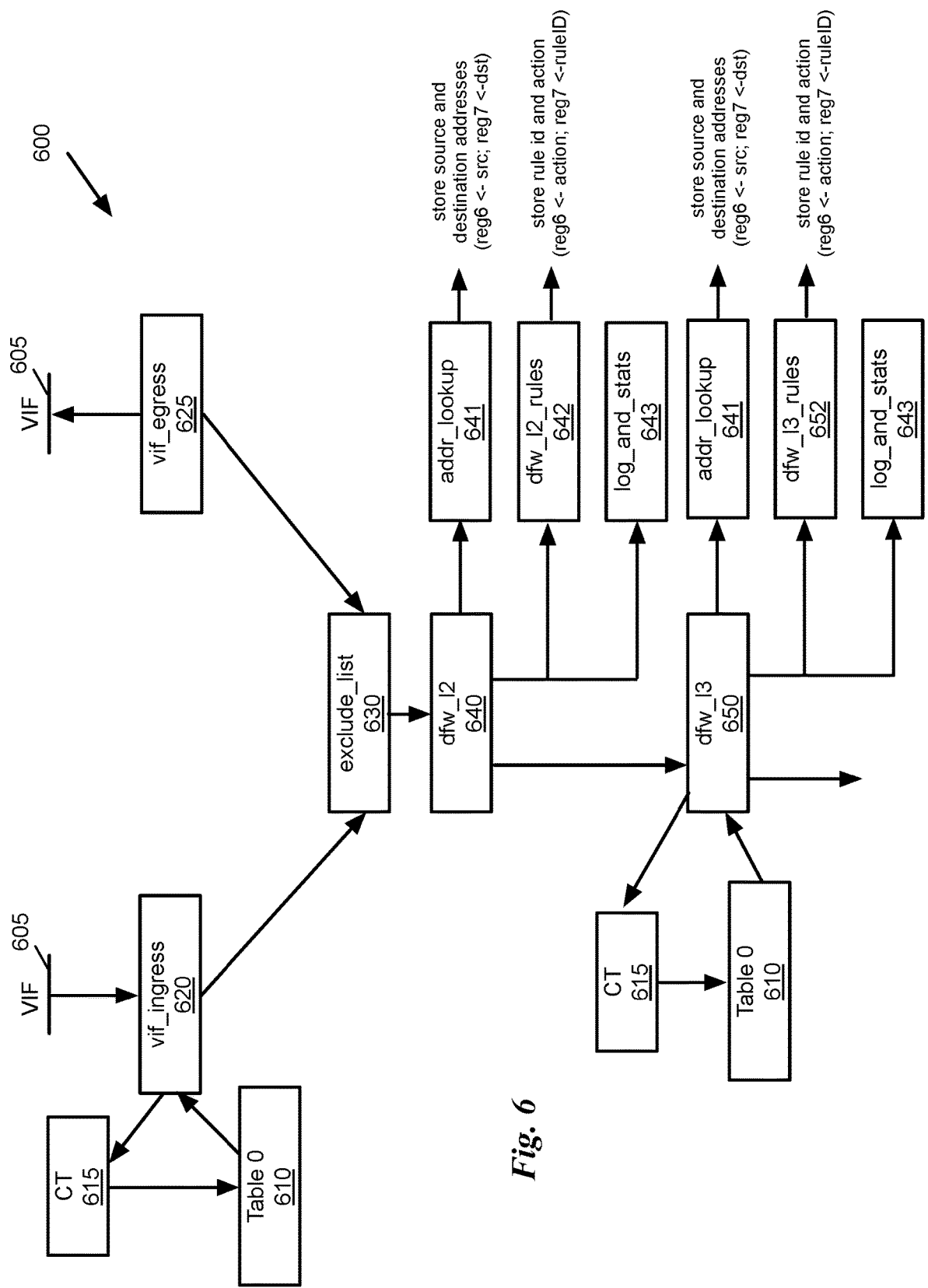
FIG. 6 conceptually illustrates a DFW pipeline that does not include third party security services.

FIG. 6 conceptually illustrates a DFW pipeline 600 that does not include third party security services. The figure shows different modules that activate/access each other in order to process the DFW rules. The figure shows an ingress path and an egress packet (both from the MFE view point) for a VIF 605.

In the ingress path, the vif_ingress module 620 sends the packets to the connection tracker 615. The connection tracker 615 checks connection table (table 0) 610 to determine the status of the packet flow (e.g., new or established connection). The connection tracker 615 also stores the information about the new connections in the connection table 610. For instance, after a packet that belongs to a new flow is accepted, the connection tracker receives a conntrack_commit from the firewall engine and stores the connection information for the new flow.

The connection information in some embodiments includes the connection n-tuple (e.g., source IP address, source port address, destination IP address, destination port number, and protocol used). Since there may be multiple third party security services and each service may require stateful connection information, the connection table maintains one entry per service for each connection. Each entry, therefore, includes the identification of the corresponding security service.

A connection entry may include other information such as a zone filed that stores the identification of a corresponding VIF, a matching rule identification (stored in a "connmark" field), etc., that is used in different firewall rules. In the example of FIG. 6, all lookups for the connection tracker returns to a single table, i.e., table 0 610. It is also possible to resubmit the returned packet to any connection table.

As shown, the vif_ingress module 620 sends packet to exclude_list 630 to check the packets against an exclude list. Similarly, in the egress path vif_egress module 625 sends packet to exclude_list 630 to check the packets against an exclude list. If the VIF is in the exclude list, the enforcement of the firewall rules are bypassed.

Next in either ingress or egress path, network Layer 2 (L2) firewall rules are checked by dfw_l2 module 640 for the packets that are not in the exclude list. The dfw_l2 module 640 activates addr_lookup module 641 to lookup the source and destination addresses of the packets. The addr_lookup module 641 examines a packet's header and stores the source and destination addresses of the packet in temporary storage (in this example register 6 is used to store the source address and register 7 is used to store the destination address).

Next, the dfw_l2 rules module 642 is activated to use the source and destination addresses of the packet and lookup the rule identification and the action for enforcing L2 firewall rules on the packet. The dfw_l2 rules module 642 stores the rule identification and the action to perform on the packet in temporary storage (in this example register 6 is reused to store the action and register 7 is reused to store the rule identification). Next, log_and_stats module 643 is activated to update the log files and the flow statistics.

If a packet is not dropped by dfw_l2 module 640, the packet is passed to dfw_l3 module 650 to check network Layer 3 (L3) firewall rules. As described above, vif_ingress module 620 activates connection tracker 615 to check the packet flow's connection status. On the other hand, the vif_egress module 625 does not activate the connection tracker 615. Therefore, in the egress path, the dfw_l3 module 650 passes the packet to the connection tracker 615 to check the connection's status. In the ingress path, the dfw_l3 module 650 does not activate the connection tracker module 615.

The connection tracker 615 (activated in the egress path by the dfw_l3 module 650) checks connection table (table 0) 610 to determine the status of the packet flow. The connection tracker 615 also updates the information about the information in the connection table 610.

The dfw_l3 module 650 activates addr_lookup module 641 to lookup the source and destination addresses of the packets. The addr_lookup module 641 examines a packet's header and stores the source and destination addresses of the packet in temporary storage (in this example register 6 is used to store the source address and register 7 is used to store the destination address).

Next, the dfw_l3 rules module 652 is activated to use the source and destination addresses of the packet and lookup the rule identification and the action for enforcing L3 firewall rules on the packet. The dfw_l3 rules module 652 stores the rule identification and the action to perform on the packet in temporary storage (in this example register 6 is reused to store the action and register 7 is reused to store the rule identification). Next, log_and_stats module 643 is activated to update the log files and the flow statistics.

Based on whether or not a packet passes firewall rules, dfw_l3 module 650 performs typical firewall actions such as accept, deny, or reject on the packet. If the connection is accepted, a conntrack_commit command is issued to commit the connection into the connection table.

As can be seen, there is no repetition semantics and the connection tracker 615 and rules lookup 641 are done at most twice (if the packet's source and destination VMs are hosted in same host). The connection tracker lookup is done a maximum of two times (as the packet gets off the VIF and at dfw_l3 egress stage). L2 and L3 rules are looked up only once per ingress or egress direction.

Figure 7:
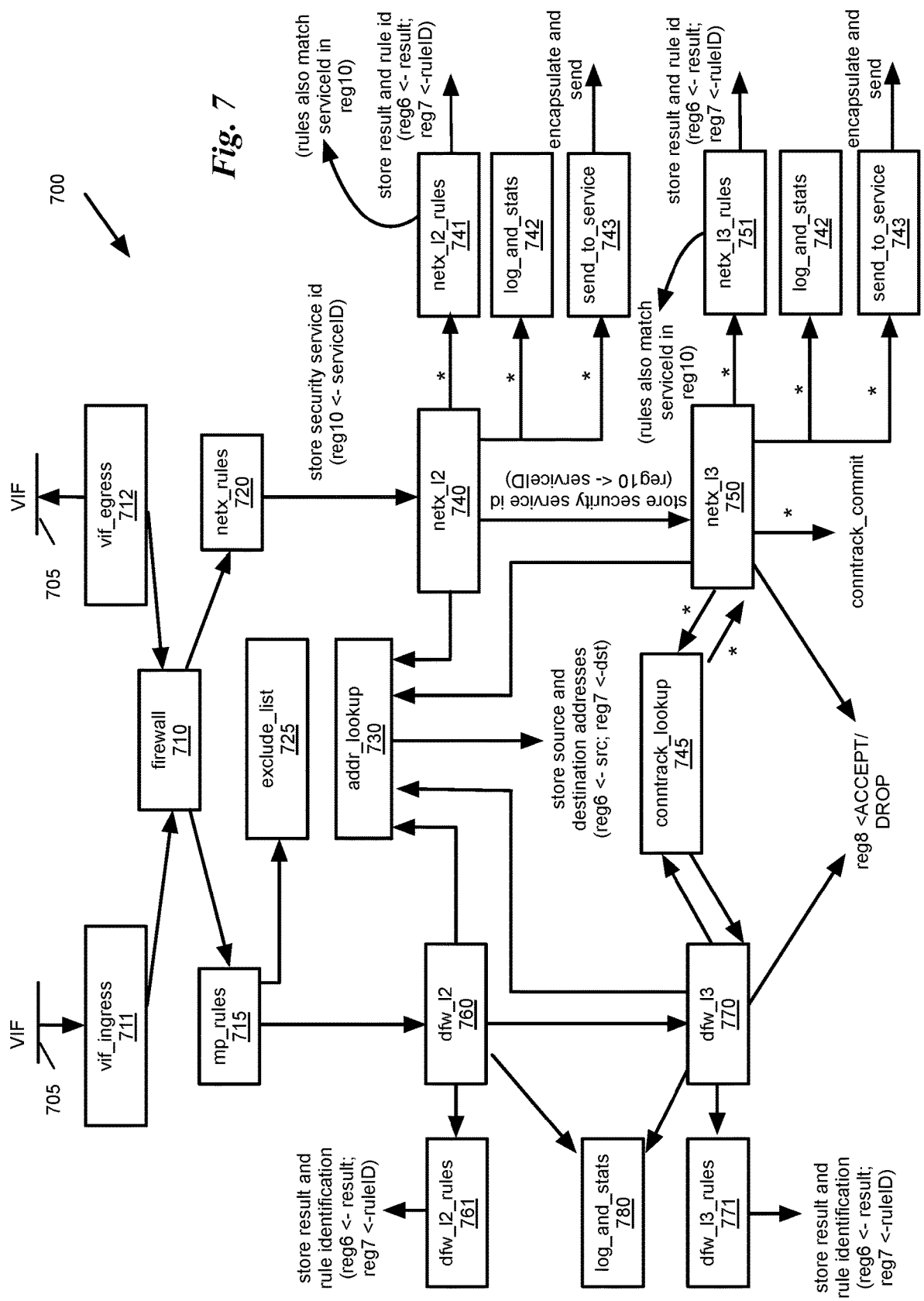
FIG. 7 conceptually illustrates a DFW pipeline that includes third party security services in some embodiments.

FIG. 7 conceptually illustrates a DFW pipeline 700 that includes third party security services in some embodiments. The figure shows different modules that activate/access each other in order to process the DFW and the third party security service rules. NetX security services are examples of the third party security services. The figure shows an ingress path and an egress packet (both from the MFE view point) for a VIF 705.

The packets in the ingress path (i.e., packets going into the MFE from the VIF 705) are intercepted by vif_ingress module 711 while the packets in the egress path (i.e., packets leaving the MFE to the VIF 705) are intercepted by the vif_egress module 712. The vif_ingress module 711 the vif_egress module 712 pass the packets to initial firewall stage 710, which selects the sequence depending on the ingress or egress direction of a packet.

As described above by reference to FIGS. 2-4, for the packets in the ingress path the firewall rules are enforced first. For these packets, the initial firewall module 710 passes the packets to the mp_rules module 715 to enforce the firewall rules that are defined at the management plane. Once the firewall rules that are defined at the management plane are enforced for the ingress packets, the netx_rules module 720 is activated to enforce the rules that are defined by the third party service providers for these packets.

For the packets in the egress path, on the other hand, the third party security service rules are enforced first. For these packets, the initial firewall module 710 passes the packets to the netx_rules module 720 to enforce the rules that are defined by the third party service providers. Once the firewall rules that are defined rules that are defined by the third party service providers are enforced for the egress packets, the mp_rules module 715 is activated to enforce the firewall rules that are defined at the management plane for these packets.

As shown, the exclude list 725 does not apply to the third party service rules NetX. Therefore, only the mp_rules module 715 checks the packets against the exclude list by activating the exclude_list module 725. The operations of dfw_l2 760 and dfw_l3 770 modules are similar to the operations of dfw_l2 640 and dfw_l3 650 described above by reference to FIG. 6. The dfw_l2 module 760 activates addr_lookup module 730, dfw_l2_rules module 761, and log_and_stats module 780 similar to what was described above by reference to FIG. 6 for the dfw_l2 module 640. The dfw_l3 module 770 activates addr_lookup module 730, dfw_l3_rules module 771, and log_and_stats module 780 similar to what was described above by reference to FIG. 6 for the dfw_l3 module 650.

The NetX repetitive semantics is implemented at netx_l2 740 and netx_l3 750 stages in order to enforce the security rules of multiple services. The NetX rules can have all the fields and attributes as a DFW rule. Since there are L2 and L3 NetX rules per service, the L3 rules for the higher priority services are executed before the L2 rules of the lower priority services. For instance, the execution sequence in FIG. 3 is DFW L2 rules, DFW 215 L3 rules, Service 1 305 L2 rules, Service 1 305 L3 rules, Service 2 310 DFW L2 rules, Service 2 310 DFW L3 rules, and so on.

The netx_l2 module 740 performs L2 security rule enforcement for each service by activating netx_l2 rules module 741, followed by log_and_stats module 742, followed by send_to_service module 743 for each service. Multiple calls can be performed to each of these modules as indicated by a * mark on the arrows.

In this example, a temporary storage (e.g., reg10) keeps the service ID to be verified. As the rules for a service are verified, the next service ID is populated by netx_rules 710 in reg10 and netx_l2 and netx_l3 resubmit to themselves. Packets are sent to send_to_service module 742 to encapsulate with overlay network header and metadata required to enforce each service rule. The packets are sent by send_to_service module 743 to the service VM port (e.g., through port 191, VNIC 126, to SVM 112. The SVM then checks the packet information against the service rules and come with a verdict such as accept, drop, etc.

The netx_l3 module 750 performs L3 security rule enforcement for each service by activating netx_l3 rules module 751, followed by log_and_stats module 742, followed by send_to_service module 743 for each service. Multiple calls can be performed to each of these modules as indicated by a * mark on the arrows. Packets are sent to send_to_service module 742 to encapsulate with overlay network header and metadata required to enforce each service rule.

Figure 8:
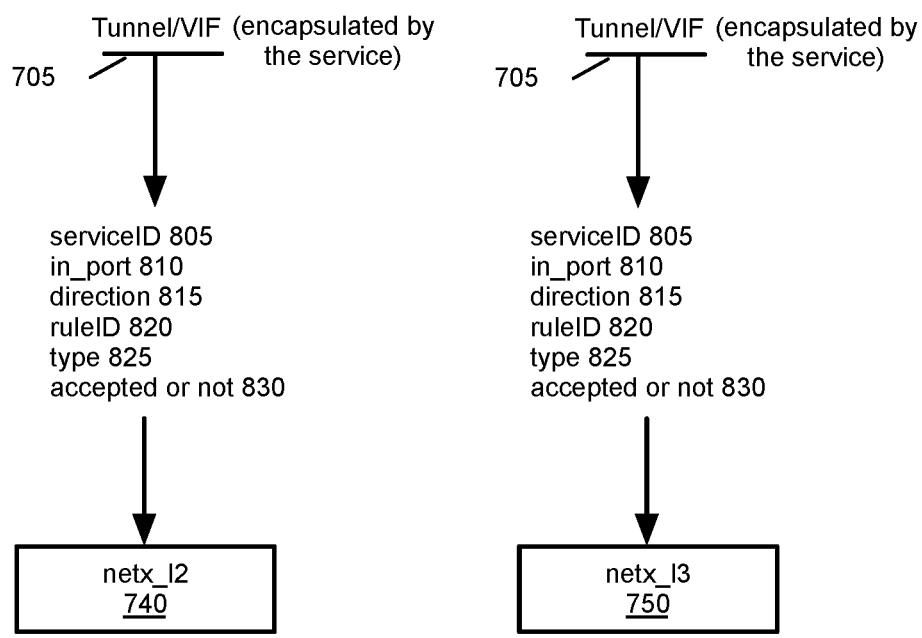
FIG. 8 conceptually illustrates the information passed from the service VMs (or the remote security service machines) to the NetX module in some embodiments FIG. 9 conceptually illustrates a process for enforcing third party security rules for a packet in some embodiments.

FIG. 8 conceptually illustrates the information passed from the service VMs (or the remote security service machines) to the NetX module in some embodiments. As shown, the service machine (e.g., SVM 112 or the remote security service 121 in FIG. 1) includes information such as service identification 805, input port identification 810, packet direction (ingress into the MFE or egress from the MFE) 815, the rule identification 820, the rule type (L2 or L3) 825, and whether the packet is accepted or not 830 in the overlay header that encapsulates the packets. The encapsulated packet is received by the netx_l2 740 and netx_l3 750 modules. The metadata 805-825 included in the overlay encapsulation header is used by the netx_l2 740 and netx_l3 750 modules in order to decide what to do next with the packet (e.g., drop the packet, send the packet to the next service, etc.).

Some embodiments perform packet logging for every NetX rule hit. As a result, a packet might be logged many times as it is possible that multiple service rules hit the same packet. Similarly, these embodiments keep the statistics (the stats) per-rule. In some embodiments, the connection entries in the connection tracker table are marked (using "connmark" by the matching the NetX rule for that service.

The send_to_service module 743 sends the packets to the service VM port (e.g., through port 191, VNIC 126, to SVM 112) for either L2 or L3 rule enforcement. Alternatively, the packet is sent through a port such as 192, port 130, the overlay network tunnel 150 in the network 145 to a remote security service machine 121-122. The SVM (or the remote service) then checks the packet information against the service rules and comes up with a verdict such as accept, drop, etc.

When a packet comes back from the SVM or the remote service, the overlay network encapsulation is used to reroute the packet back to netx_l2 or netx_l3 module with the relevant register values. One register (e.g., reg8) is always set to ACCEPT when packet comes from the security service (if the packet is not accepted, the security service drops the back without sending it back). Therefore netx_l2 or netx_l3 module knows that it should not run the rules again for this service (i.e. for the serviceId indicated by reg10). The netx_l2 or netx_l3 module, therefore, directly accepts that packet, performs connection tracker lookup and commit if required, and moves to the next service.

If reg8 is empty, then netx_l2 or netx_l3 module will execute the rules of the service indicated in reg10. All service rules reside in netx_l2 rules (stored in reg6 by netx_l2 rules module 741) and netx_l3 rules (stored in reg6 by netx_l3 rules module 751). The current service identification is also stored in reg10. Therefore, a resubmit to rules table will only match the rules of a specific service at a time.

The NetX rules can be stateful, which means, the response packets in a connection should not lookup the rules again. For instance, assume an initial packet PI has hit service 1's rule R1 and was sent (based on a PUNT decision) to service 1 VM. When the response packet P2 comes, the same action (i.e., the PUNT) should be executed again to send the response packet P2 to service 1 VM without running any NetX rules (e.g., activating netx_l3 rules 751) for service 1. The netX rules for other service are not skipped though since other services might have hit stateless rules. As a result, a separate connection tracker entry is kept per service.

As shown, the netx_l3 module 750 always performs the connection tracker lookup by activating conntrack_lookup 745 module for each service. The connection tracker zone parameter for connection table lookup is constructed by concatenating the service number and the VIF (e.g., port 135 in FIG. 1) context. For instance, in some embodiments the zone is 16 bits with the first 5 bits used for service ID and the remaining 11 bits for the VIF context. As a result, each service has its own connection tracker space and the information for the services is not mixed.

Some embodiments support an action-overwrite operation. This is a special case for NetX, which is different from the DFW. The SVM (or the remote service machine) that is enforcing the service rules can write into the connection tracker entry in an out of band manner in order to ACCEPT or DENY the connection packets, without sending them to service VM (or the remote service machine).

This means, the service VM (or the remote service machine) that is enforcing the service rules is not interested in inspecting the packets of that connection anymore and is instructing the pipeline to just accept/deny those packets without executing any NetX rules for that service (hence not punting/redirecting/copying) any more. Therefore, if the result of connection tracker lookup shows that there is an "action-overwrite", no rule lookups is performed. The packet is either directly accepted and control is moved on to the next service (in case of ACCEPT overwrite), or the packet is dropped (in case of DENY overwrite).

In order to provide the action-overwrite operation, some embodiments provide a control channel between the SVM or the remote service machine (e.g., in one of the functions of a software development kit (SDK) used by the SVM or the remote service machine) and the L3 domain (L3D) that controls the connection tracker to make changes to the connection tracker entries as well as pull the information about the existing entries.

Figure 9:
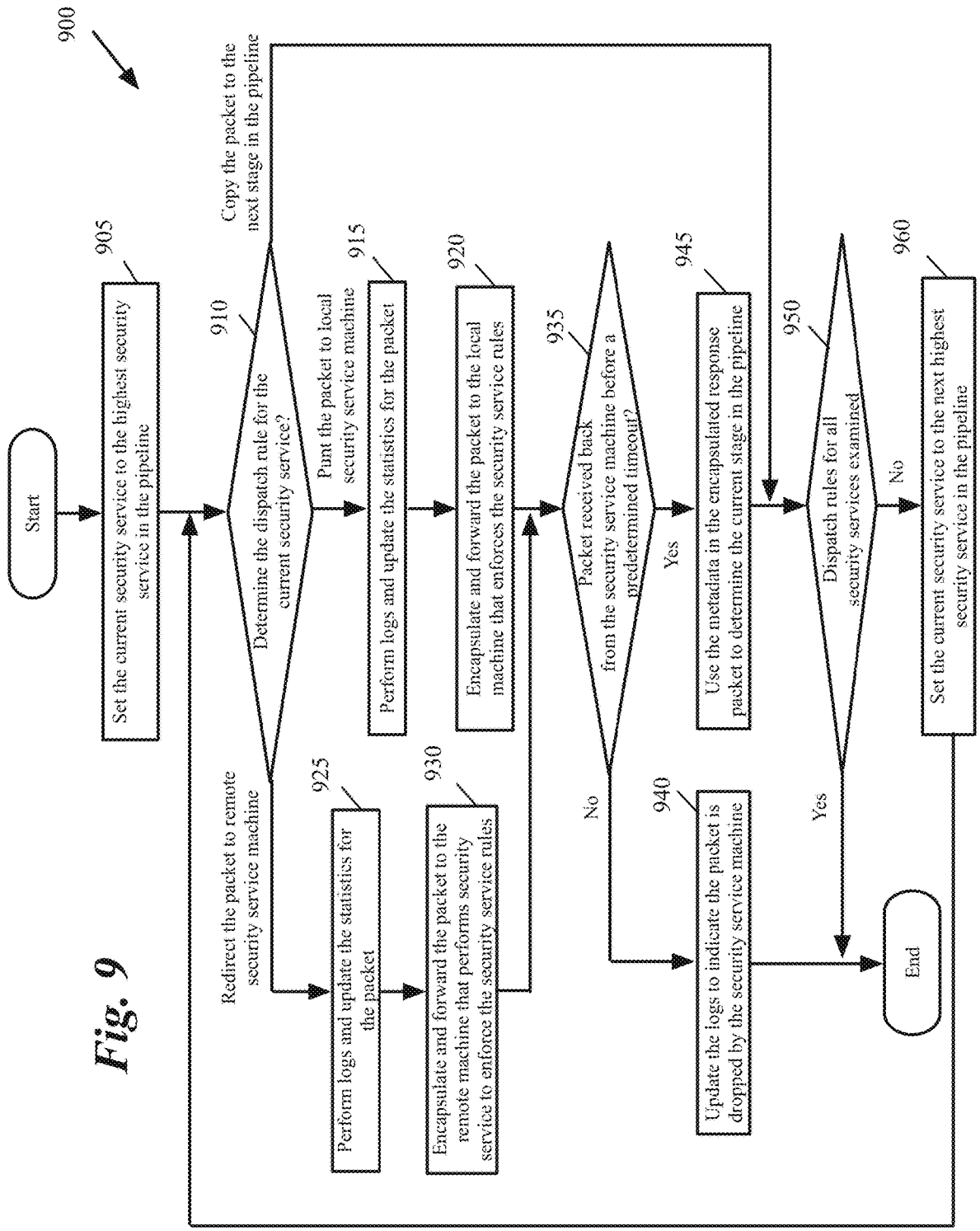

FIG. 9 conceptually illustrates a process 900 for enforcing third party security rules for a packet in some embodiments. The process in some embodiments is performed by a set of modules such as the netx_rules 720 and modules 740-751 in FIG. 7 after a packet is passed to the netx_rules 720 module. As shown, the process sets (at 905) the current security service to the highest priority security service in the pipeline. For instance, the process starts with the highest priority security service such as the security service associated with Service 1 rules 305 in FIGS. 3 and 4.

Next, the process determines (at 910) the dispatch rule for the current security service. For instance, netx_l2 rules module 741 or netx_l3 rules module 751 in FIG. 7 use the current serviceID to identify ruleID to perform for the current security service. When the dispatch rule indicates the packet has to be sent to the local security service machine corresponding to the current security service, the process proceeds to 915. For instance, when the dispatch rule is PUNT, the security service is performed by a local machine such as the SVM 112 in the host in FIG. 1.

The process then performs (at 915) logs and updates the statistics for the packet. For instance, log_and_stats module 742 performs log and updates the statistics for the packet as described above by reference to FIG. 7. The process then encapsulates (at 920) the packet with overlay network header and forwards the packet to the local machine that enforces the third party's security service rules. For instance, the send_to_service module 743 in FIG. 7 encapsulate the packet with the overlay network header and sends the packet to an SVM 112-113 local to the host 100 in FIG. 1. The process then proceeds to 935, which is described below.

When the dispatch rule indicates the packet has to be copied to the next stage in the firewall and security service pipeline (e.g., when the dispatch rule is COPY), the process proceeds to 950, which is described below. When the dispatch rule indicates the packet has to be redirected to the remote security service machine corresponding to the current security service, the process proceeds to 925. For instance, when the dispatch rule is REDIRECT, the security service is performed by a remote machine such as the SVM 112 in FIG. 1. The process then performs (at 925) logs and updates the statistics for the packet. For instance, log_and_stats module 742 performs log and updates the statistics for the packet as described above by reference to FIG. 7. The process then encapsulates (at 930) the packet with overlay network header and forwards the packet to the local machine that enforces the third party's security service rules. For instance, the send_to_service module 743 in FIG. 7 encapsulate the packet with the overlay network header and sends the packet to an SVM 112-113 local to the host 100 in FIG. 1. The process then determines (at 935) whether the packet is received back from the security service machine before a predetermined timeout expires. If not, the process assumes that the security service has dropped the packet. The process updates (At 940) the logs to indicate the packet is dropped by the security service machine. The process then ends.

Otherwise, the process uses (at 945) the metadata in the encapsulated response packet to determine the current stage in the pipeline. For instance, the process uses the metadata included in the overlay encapsulation header as described above by reference to FIG. 8 to determine the current stage in the pipeline and to determine what to do with the packet next. For instance, if the current stage was checking the packet against L2 rules of a security service, the next stage may be checking the packet against L3 rules by the same security service. On the other hand, if the current stage was checking the L3 rules by a security service, the next stage may be checking the L2 rules by the next highest priority security service, checking the packet against the distributed firewall rules if the current security service is the lowest priority security service and the packet is in the MFE's egress direction. Alternatively, if the current security service is the lowest priority security service and the packet is in the MFE's ingress direction, the next stage is to send the packet back to the MFE to forward the packet to its destination.

The process then determines (at 950) whether the dispatch rules for all security services are examined. If yes, the process ends. Otherwise, the process sets (at 960) the current security service to the next highest security service in the pipeline. The process then proceeds to 910, which was described above.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
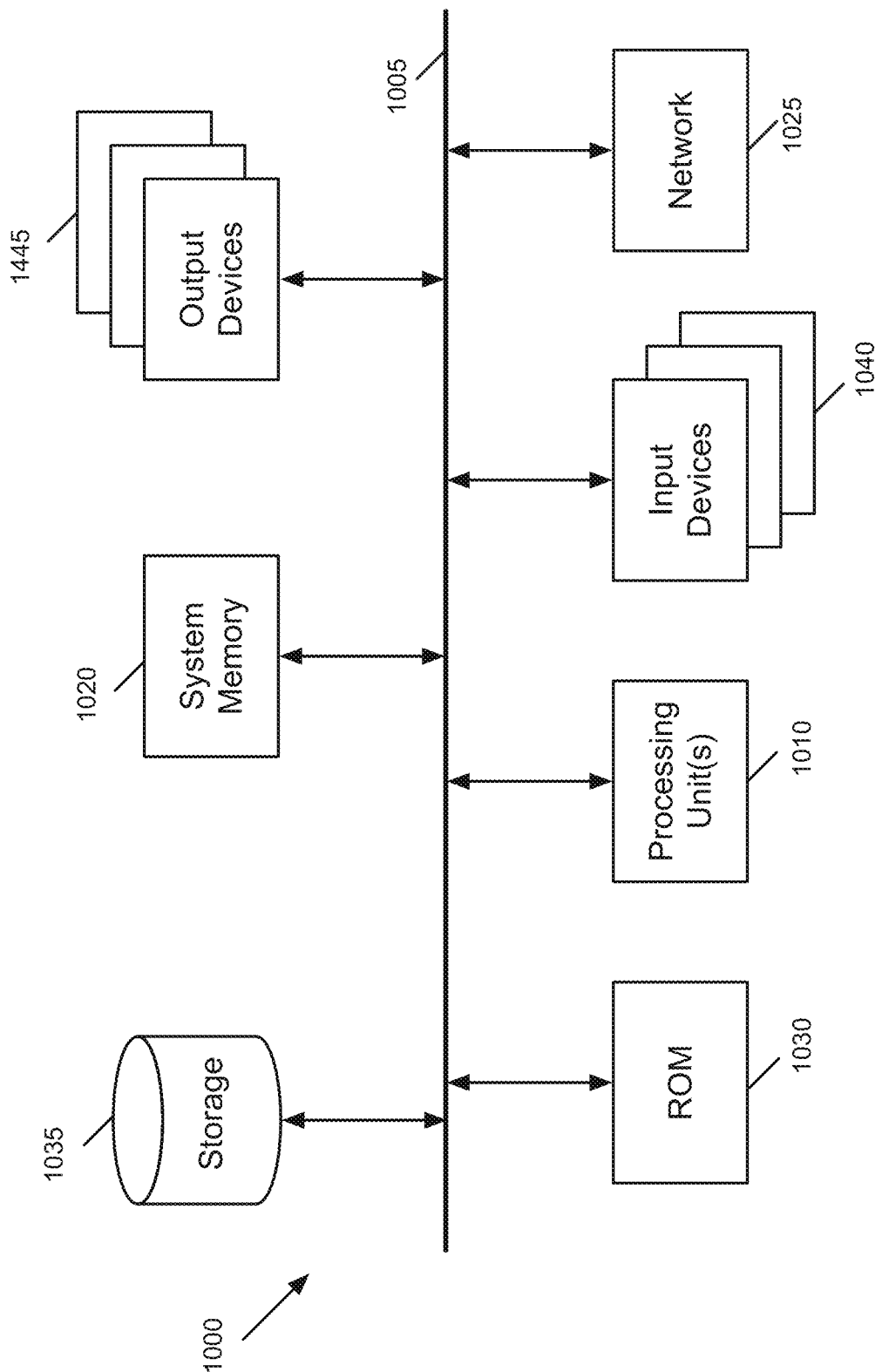
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1020, a read-only memory (ROM) 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1020 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. #08 and #09) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of performing services on a packet associated with a machine executing on a host computer, the method comprising:
at a security service dispatcher executing on the host computer:
receiving the packet from a module along (i) an ingress path of the packet into the host computer to the machine which is a destination of the packet or (ii) an egress path of the packet out of the host computer from the machine which is a source of the packet, the module executing on the host computer;
identifying, for the packet, a plurality of service dispatch rules for a plurality of candidate services to perform on the packet, each service dispatch rule of the plurality of service dispatch rules specifying a dispatch action for a candidate service of the plurality of candidate services that is associated with each service dispatch rule of the plurality of service dispatch rules; and
iteratively processing each service dispatch rule of the plurality of service dispatch rules by:
when a particular service dispatch rule of the plurality of service dispatch rules specifies that a particular candidate service of the plurality of candidate services that is associated with the particular service dispatch rule of the plurality of service dispatch rules has to be performed on the packet, forwarding the packet to a particular service machine to perform the particular candidate service, the particular service machine returning the packet to the security service dispatcher after the particular service machine performs the particular candidate service and when performance of the particular candidate service by the particular service machine does not result in dropping of the packet;

when the particular service dispatch rule of the plurality of service dispatch rules specifies that the particular candidate service does not have to be performed on the packet, forgoing forwarding the packet to the particular service machine to perform the particular candidate service; and after processing the particular service dispatch rule, proceeding to a next service dispatch rule in the plurality of service dispatch rules until all of the plurality of service dispatch rules have been processed.

2. The method of claim 1, wherein at least one of the plurality of candidate services determines whether the packet has to be accepted or dropped.

3. The method of claim 1, wherein the host computer comprises a flow-based managed forwarding element (MFE) implementing a software switch and stores a plurality of distributed firewall rules, the method further comprising:
when the packet is along the ingress path, enforcing the plurality of distributed firewall rules on the packet before the security service dispatcher receives the packet; and
when the packet is along the egress path, enforcing the plurality of distributed firewall rules after the security service dispatcher has processed all of the plurality of service dispatch rules.

4. The method of claim 1, wherein a set of the plurality of service dispatch rules are stateful, wherein the packet is communicated over a network connection between a source node and a destination node, the method further comprising:
for each service dispatch rule of the set of the plurality of service dispatch rules that are stateful, storing (i) an identification of a particular associated candidate service and (ii) an identification of the network connection in a connection tracking table, wherein the connection tracking table is used to enforce the set of the plurality of service dispatch rules that are stateful for the packet.

5. The method of claim 4, wherein particular candidate services that are associated with the set of the plurality of service dispatch rules are stateful, wherein the connection tracking table is used to enforce the particular candidate services that are stateful for the packet.

6. The method of claim 1, wherein the security service dispatcher encapsulates the packet in a header when forwarding the packet to the particular service machine for at least one service dispatch rule.

7. The method of claim 1, wherein the particular service machine returning the packet to the security service dispatcher comprises the particular service machine encapsulating the packet in a header before returning the packet to the security service dispatcher, the method further comprising using the header to identify the next service dispatch rule.

8. The method of claim 7, wherein the particular service machine is one of a service data compute node executing on the host computer and a remote computing node executing outside of the host computer.

9. The method of claim 1, wherein the packet is forwarded to a destination of the packet when no service machine drops the packet.

10. The method of claim 1, wherein the host computer comprises a flow-based managed forwarding element (MFE) implementing a software switch, wherein the security service dispatcher receives packets sent and received at each of a set of MFE ports.

11. A non-transitory machine readable medium storing a security service dispatcher which when executed by at least one processing unit of a host computer performs services on a packet associated with a machine executing on the host computer, the security service dispatcher comprising sets of instructions for:
receiving the packet from a module along (i) an ingress path of the packet into the host computer to the machine which is a destination of the packet or (ii) an egress path of the packet out of the host computer from the machine which is a source of the packet, the module executing on the host computer;
identifying, for the packet, a plurality of service dispatch rules for a plurality of candidate services to perform on the packet, each service dispatch rule of the plurality of service dispatch rules specifying a dispatch action for a candidate service of the plurality of candidate services that is associated with each service dispatch rule of the plurality of service dispatch rules; and
iteratively processing each service dispatch rule of the plurality of service dispatch rules by:
forwarding the packet to a particular service machine to perform a particular candidate service of the plurality of candidate services that is associated with a particular service dispatch rule of the plurality of service dispatch rules, when the particular service dispatch rule of the plurality of service dispatch rules specifies that the particular candidate service has to be performed on the packet, the particular service machine returning the packet to the security service dispatcher after the particular service machine performs the particular candidate service and when performance of the particular candidate service by the particular service machine does not result in dropping of the packet;
forgoing forwarding the packet to the particular service machine to perform the particular candidate service when the particular service dispatch rule of the plurality of service dispatch rules specifies that the particular candidate service does not have to be performed on the packet; and
proceeding to a next service dispatch rule in the plurality of service dispatch rules after processing the particular service dispatch rule until all of the plurality of service dispatch rules have been processed.

12. The non-transitory machine readable medium of claim 11, wherein at least one of the plurality of candidate services determines whether the packet has to be accepted or dropped.

13. The non-transitory machine readable medium of claim 11, wherein forwarding the packet to the particular service machine comprises encapsulating the packet in a header and forwarding the packet to the particular service machine.

14. The non-transitory machine readable medium of claim 11, wherein a set of the plurality of service dispatch rules are stateful, wherein the packet is communicated over a network connection between a source node and a destination node, the security service dispatcher further comprising a set of instructions for:
storing, for each service dispatch rule of the set of the plurality of service dispatch rules that are stateful, (i) an identification of a particular associated candidate service and (ii) an identification of the network connection in a connection tracking table, wherein the connection tracking table is used to enforce the set of the plurality of service dispatch rules that are stateful for the packet.

15. The non-transitory machine readable medium of claim 14, wherein particular candidate services that are associated with the set of the plurality of service dispatch rules are stateful, wherein the connection tracking table is used to enforce the particular candidate services that are stateful for the packet.

16. The non-transitory machine readable medium of claim 11, wherein the security service dispatcher comprises a set of instructions for encapsulating the packet in a header when forwarding the packet to the particular service machine for at least one service dispatch rule.

17. The non-transitory machine readable medium of claim 11, wherein the particular service machine returning the packet to the security service dispatcher comprises the particular service machine encapsulating the packet in a header before returning the packet to the security service dispatcher, wherein the security service dispatcher further comprises a set of instructions for using the header to identify the next service dispatch rule.

18. The non-transitory machine readable medium of claim 17, wherein the particular service machine is one of a service data compute node executing on the host computer and a remote computing node executing outside of the host computer.

19. The non-transitory machine readable medium of claim 11, wherein the packet is forwarded to a destination of the packet when no service machine drops the packet.

20. The non-transitory machine readable medium of claim 11, wherein the host computer comprises a flow-based managed forwarding element (MFE) implementing a software switch, wherein the security service dispatcher receives packets that are sent and received at each of a set of MFE ports.

\* \* \* \* \*